US012156305B2

(12) United States Patent
Ye et al.

(10) Patent No.: US 12,156,305 B2
(45) **Date of Patent: *Nov. 26, 2024**

(54) LIGHTING APPARATUS

(71) Applicant: XIAMEN ECO LIGHTING CO. LTD., Xiamen (CN)

(72) Inventors: Hemu Ye, Xiamen (CN); Qiqiang Lin, Xiamen (CN); Zongyuan Liu, Xiamen (CN); Yankun Li, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,430

(22) Filed: Sep. 7, 2021

(65) Prior Publication Data

US 2022/0078893 A1 Mar. 10, 2022

(30) Foreign Application Priority Data

Sep. 7, 2020 (CN) ......................... 202010930211.0

(51) Int. Cl.

*H05B 45/14* (2020.01)
*H05B 45/24* (2020.01)
*H05B 45/325* (2020.01)
*H05B 45/345* (2020.01)

(52) U.S. Cl.

CPC ............. *H05B 45/14* (2020.01); *H05B 45/24* (2020.01); *H05B 45/325* (2020.01); *H05B 45/345* (2020.01)

(58) Field of Classification Search

CPC .... H05B 45/14; H05B 45/345; H05B 45/325; H05B 45/24; H05B 4/20
See application file for complete search history.

(56) References Cited

U.S. PATENT DOCUMENTS

2006/0186820 A1* 8/2006 Yang .................... G09G 3/3406 315/158
2008/0007419 A1* 1/2008 Tsai ..................... H05B 45/325 340/815.45
2009/0289579 A1* 11/2009 Zielinski ................ H05B 45/20 315/297
2014/0035472 A1* 2/2014 Raj ........................ H05B 45/22 315/297
2017/0034893 A1* 2/2017 Chen ...................... H05B 47/19

(Continued)

*Primary Examiner* — Evan P Dzierzynski
*Assistant Examiner* — Jessica M Apenteng
(74) *Attorney, Agent, or Firm* — Chun-Ming Shih; LANWAY IPR SERVICES

(57) ABSTRACT

A lighting apparatus includes a first light source, a second light source, a current controller, a current source and a signal converter. The first light source and the second light source are two light sources of a light source set. The light source set may further include more light source of same type of different type. The current source is controlled by the current controller for generating a first driving current to the first light source and for generating a second driving current to the second light source. The signal converter converts a first type control signal to a second type control signal. The first type control signal indicates a light parameter to be produced by the light source set and the second light source. The second type control signal is supplied to the current controller to determine the first driving current and the second driving current.

17 Claims, 5 Drawing Sheets

(56) References Cited

U.S. PATENT DOCUMENTS

| | | | | |
|---|---|---|---|---|
| 2020/0305249 | A1* | 9/2020 | Zhang | H05B 45/14 |
| 2022/0078893 | A1* | 3/2022 | Ye | H05B 45/24 |
| 2022/0095442 | A1* | 3/2022 | Yamamoto | H05B 45/50 |
| 2022/0248515 | A1* | 8/2022 | Wu | H05B 45/34 |

* cited by examiner

LIGHTING APPARATUS

FIELD

The present invention is related to a lighting apparatus, and more particularly related to a lighting apparatus with a stable driver circuit.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

PWM (Pulse Width Modulation) is a popular control signal used in LED light devices. However, PWM signals usually accompany a certain frequency of turn-off and turn-on pattern, which may cause blinking.

It is beneficial to design a driver circuit that may provide a more stable light output while maintaining flexibiliy for different situations. PWM (Pulse Width Modulation) is a popular control signal used in LED light devices. However, PWM signals usually accompany a certain frequency of turn-off and turn-on pattern, which may cause blinking.

It is beneficial to design a driver circuit that may provide a more stable light output while maintaining flexibiliy for different situations. PWM (Pulse Width Modulation) is a popular control signal used in LED light devices. However, PWM signals usually accompany a certain frequency of turn-off and turn-on pattern, which may cause blinking.

It is beneficial to design a driver circuit that may provide a more stable light output while maintaining flexibiliy for different situations. PWM (Pulse Width Modulation) is a popular control signal used in LED light devices. However, PWM signals usually accompany a certain frequency of turn-off and turn-on pattern, which may cause blinking.

It is beneficial to design a driver circuit that may provide a more stable light output while maintaining flexibiliy for different situations.

SUMMARY

In some embodiments, a lighting apparatus includes a first light source, a second light source, a current controller, a current source and a signal converter.

The first light source and the second light source are two light sources of a light source set. The light source set may further include more light source of same type of different type.

The current source is controlled by the current controller for generating a first driving current to the first light source and for generating a second driving current to the second light source.

The signal converter converts a first type control signal to a second type control signal.

The first type control signal indicates a light parameter to be produced by the light source set and the second light source.

The second type control signal is supplied to the current controller to determine the first driving current and the second driving current.

In some embodiments, the signal converter is capable of receiving multiple formats of first type control signal.

One of the multiple formats is a first Pulse Width (PWM) Modulation signal.

In some embodiments, the first type control signal further includes a second PWM signal.

The first PWM signal corresponds to the first driving current and the second PWM signal corresponds to the second driving current.

In some embodiments, one of the multiple formats is an I2C signal.

In some embodiments, one of the multiple formats is a single bus interface signal.

In some embodiments, one of the multiple formats is a wireless signal received from an external device.

In some embodiments, the signal converter includes a PWM receiver and a comparator.

The comparator compares the first PWM signal from the PWM receiver with a first reference signal.

In some embodiments, the current controller includes a current detector for detecting the first driving and the second driving current for generating a second reference signal.

In some embodiments, the current controller uses the second reference signal to calibrate the first driving current and the second driving current.

In some embodiments, the signal converter has a priority list for choosing one first type control signal as a major signal to convert to the second type control signal.

In some embodiments, the first type control signal is a digital signal and the second type control signal is an analog signal corresponding to the first type control signal.

In some embodiments, the first type control signal is turned on and turned off alternatively associated with a duty ratio.

The second type control signal is kept constant corresponding to the duty ratio.

In some embodiments, the first type control signal is corresponding to a wall switch for indicating the first light parameter.

In some embodiments, the light parameter includes a mixed color temperature by the light source set.

In some embodiments, the light source set includes a third light source receiving a third driving current of the current source.

In some embodiments, the light source set includes a fourth light source receiving a fourth driving current of the current source.

In some embodiments, the first light source emits a red light, the second light source emits a green light, the third light source emits a blue light, and the fourth light source emits a white light.

In some embodiments, the first light source, the second light source, the third light source and the fourth light source are mounted on a single light source plate.

In some embodiments, the current source dispatches a first part of a total current to be the first driving current and dispatches a second part of the total current to be the second driving current.

In some embodiments, when the first type control signal is unchanged, the first driving current and the second driving current keep constant.

DETAILED DESCRIPTION

Figure 4:
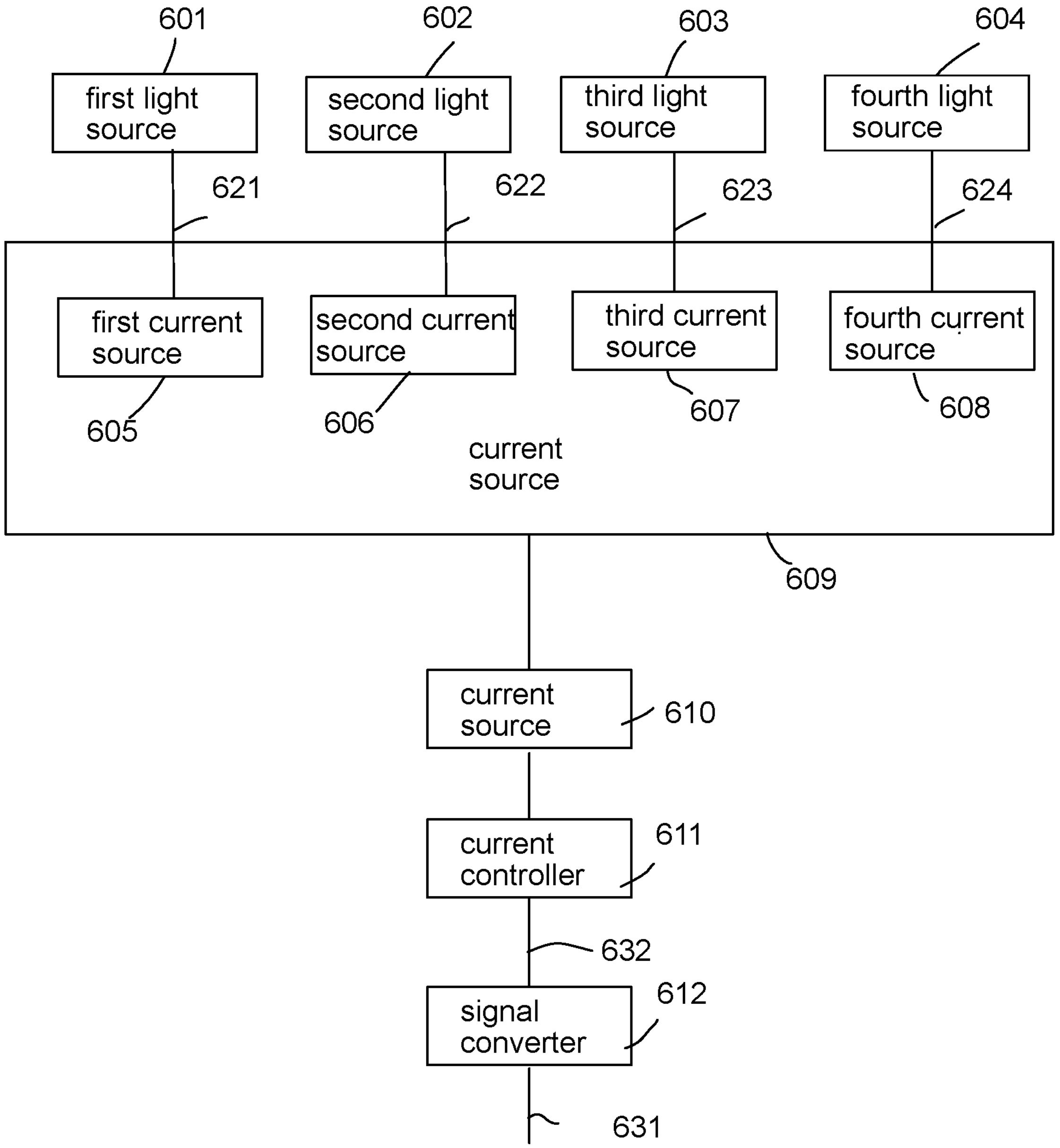
FIG. 4 shows another lighting apparatus embodiment.

In FIG. 4, a lighting apparatus includes a first light source 601, a second light source 602, a current controller 611, a current source 610 and a signal converter 612.

The first light source 601 and the second light source 602 are two light sources of a light source set. The light source set may further include more light source of same type of different type, e.g. the third light source 603 and the fourth light source 604.

The current source 609 is controlled by the current controller 611 for generating a first driving current 621 to the first light source 601 and for generating a second driving current 622 to the second light source 602. In addition, a third driving current is provided to the third light source 603. The fourth light source 604 receives a fourth driving current 624.

The current source 609 may include multiple sub-circuits, the first current source 605, the second current source 606, the third current source 607 and the fourth current source 608

The signal converter 612 converts a first type control signal 631 to a second type control signal 632.

The first type control signal indicates a light parameter of a light to be produced by the light source set 601 and the second light source 602. If more than two light sources are disposed, the light parameter of the light are also mixed by other light sources, e.g. the third light source 603 and the fourth light source 604.

The second type control signal 632 is supplied to the current controller 611 to determine the first driving current 621 and the second driving current 622.

Specifically, the signal converter 612 translates and converts an original type of control signal to a signal type suitable to control the current source 610. For example, the first type signal may be a PWM signal with a duty ratio of 30%. Such duty ratio 30% indicates a light intensity ratio between the first light source 601 and the second light source 602. In an alternative design, there is a common current supplied to both the first light source 601 and the second light source 602. The current source dispatches 30% of time for sending the common current to the first light source 601 and dispatches 70% of time for sending the common current to the second light source 602. Although the common current is the same, but the time lengths used by the first light source 601 and the second light source 602 are different, thus making the first light source 601 receives 30% of accumulated current while the second light source 602 receives 70% of accumulated current to be consistent with the PWM signal of 30% duty ratio.

However, with the design in FIG. 4, the PWM signal, as the first type control signal 631, may be converted to two analog signals with a 3:7 ratio. The first current source 605 and the second current source 606 respectively receives 3:7 analog signals, and then generate corresponding first driving current and the second driving current with 3:7 ratio according to the two analog signals.

Such concept may be extended to the third light source 603 and the fourth light source 604.

Such analog signal may be used for assigning a dispatching ratio in the current source 609, too.

In some embodiments, the signal converter is capable of receiving multiple formats of first type control signal. For example, in addition to PWM signals mentioned above, an I2C signal, a single bus interface signal, a wireless signal or other format of control signal may be received by the signal converter 612.

In some embodiments, the signal converter 612 actually receives multiple signal formats. In some other embodiments, the signal converter 612 receives only one from the multiple supported signal formats. In other words, the signal converter 612 may be used for connecting multiple control signal formats.

The signal converter 612 may be configured by a switch, a register or other unit for indicating the signal format. Multiple pins may be provided for different formats of control signals in some embodiments. The signal converter 612 may determine the format automatically in some other embodiments.

One of the multiple formats is a first Pulse Width (PWM) Modulation signal.

In some embodiments, the first type control signal further includes a second PWM signal. The second PWM signal is an invisible signal and persons of ordinary skilled in the art may refer to the first type control signal 631 illustrated in FIG. 4.

The first PWM signal corresponds to the first driving current and the second PWM signal corresponds to the second driving current.

In some embodiments, one of the multiple formats is an I2C signal.

In some embodiments, one of the multiple formats is a single bus interface signal.

In some embodiments, one of the multiple formats is a wireless signal received from an external device.

In some embodiments, the signal converter includes a PWM receiver and a comparator.

The comparator compares the first PWM signal from the PWM receiver with a first reference signal.

Figure 5:
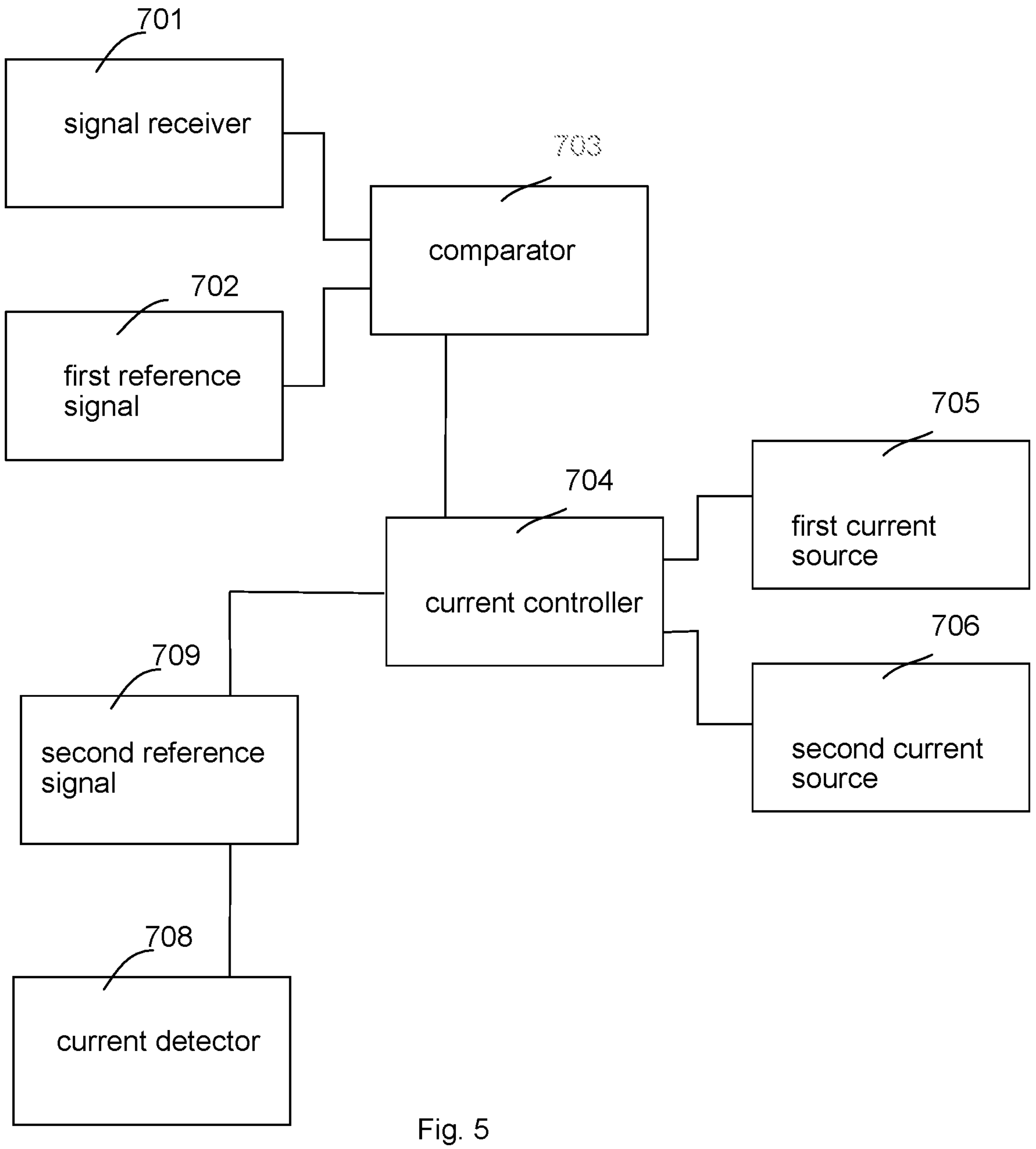
FIG. 5 shows another example of a lighting apparatus.

In FIG. 5, the current controller includes a current detector 708 for detecting the first driving and the second driving current for generating a second reference signal 709. For example, electrical paths of the output of the first driving current and the second driving current have a sub-paths to the current detector 708 to detect the actual current output forming a feedback loop. The information is supplied to the current controller 704 for adjusting output of the first current source 705 and the second current source 706.

In some embodiments, the current controller 704 uses the second reference signal 709 to calibrate the first driving current and the second driving current.

In some embodiments, the signal converter has a priority list for choosing one first type control signal as a major signal to convert to the second type control signal.

For example, there are multiple formats of first type control signals supplied to the signal converter 612. PWM signals, wireless signals, I2C signals may be transmitted from different control devices, e.g. a remote control, a wall switch or an external device. The signal converter 612 determines which control signal is used as a major reference according to a predetermined rule as the priority list.

In some embodiments, the first type control signal is a digital signal and the second type control signal is an analog signal corresponding to the first type control signal.

For example, the digital signal is a PWM signal while the analog signal is a continuous analog signal value for generating corresponding constant current without blinking problems.

In some embodiments, the first type control signal is turned on and turned off alternatively associated with a duty ratio.

The second type control signal is kept constant corresponding to the duty ratio.

In some embodiments, the first type control signal is corresponding to a wall switch for indicating the first light parameter.

In some embodiments, the light parameter includes a mixed color temperature by the light source set.

In some embodiments, the light source set includes a third light source receiving a third driving current of the current source.

In some embodiments, the light source set includes a fourth light source receiving a fourth driving current of the current source.

In some embodiments, the first light source emits a red light, the second light source emits a green light, the third light source emits a blue light, and the fourth light source emits a white light.

In some embodiments, the first light source, the second light source, the third light source and the fourth light source are mounted on a single light source plate. The single light source plate may be placed below the first light source 601, the second light source 602, the third light source 603 and the fourth light source 604 as illustrated in FIG. 4.

In some embodiments, the current source dispatches a first part of a total current to be the first driving current and dispatches a second part of the total current to be the second driving current.

In some embodiments, when the first type control signal is unchanged, the first driving current and the second driving current keep constant. Unlike PWM signals that are turned on and turned off alternatively quickly causing blinking of output light, the constant current design eliminates such problem.

Figure 3:
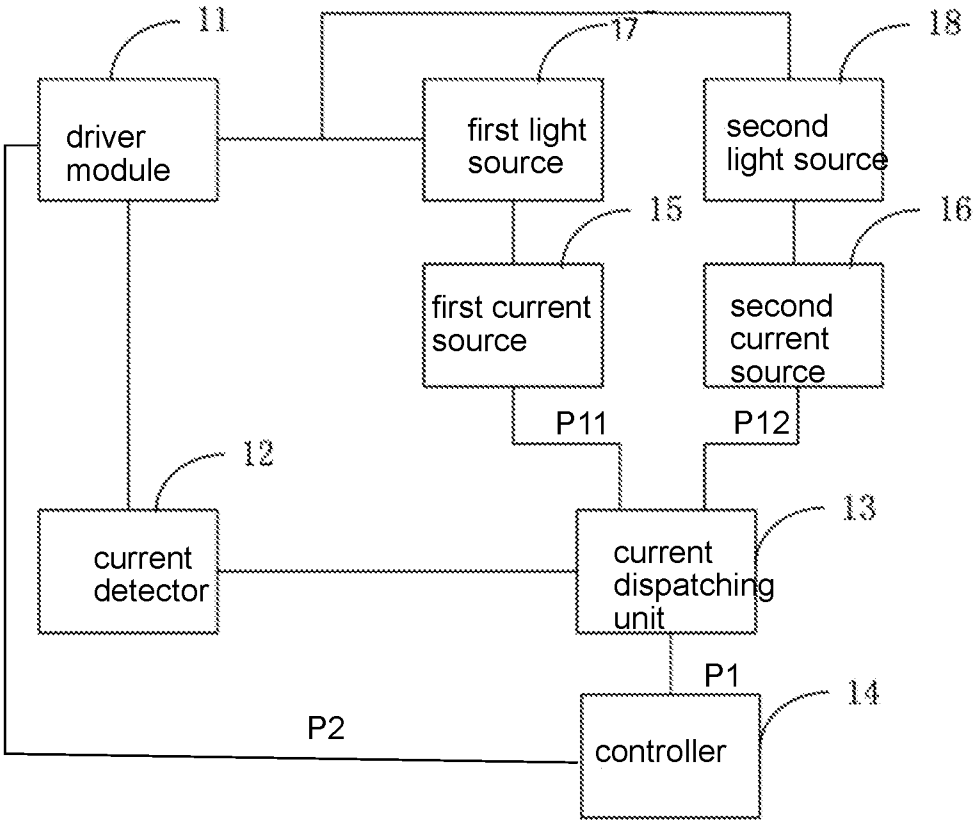
FIG. 3 illustrates a circuit diagram of a second embodiment.

Please refer to FIG. 3, which illustrates a first embodiment.

In FIG. 3, the color temperature adjusting signal P1 instructs current dispatching unit 13 to dispatch currents to the first light source 17 and the second light source 18 with a current ratio determined by the color temperature adjusting signal P1. In such design, even the first light source 17 and the second light source 18 have different number of LED chips, the current radio is accurately determined by the signal P1. Two second type control signals P11 and P12 are generated to the first current source 15 and the second current source 16. The drier module 11 provides two different currents to the first light source 17 and the second light source 18. The current detector 12 detects the actual current so that the current dispatching unit 13 may adjust the P11 and P12 accordingly. The controller 14 determines and adjusts P1 according to the signal P2 generated by the drive module 11.

Figure 1:
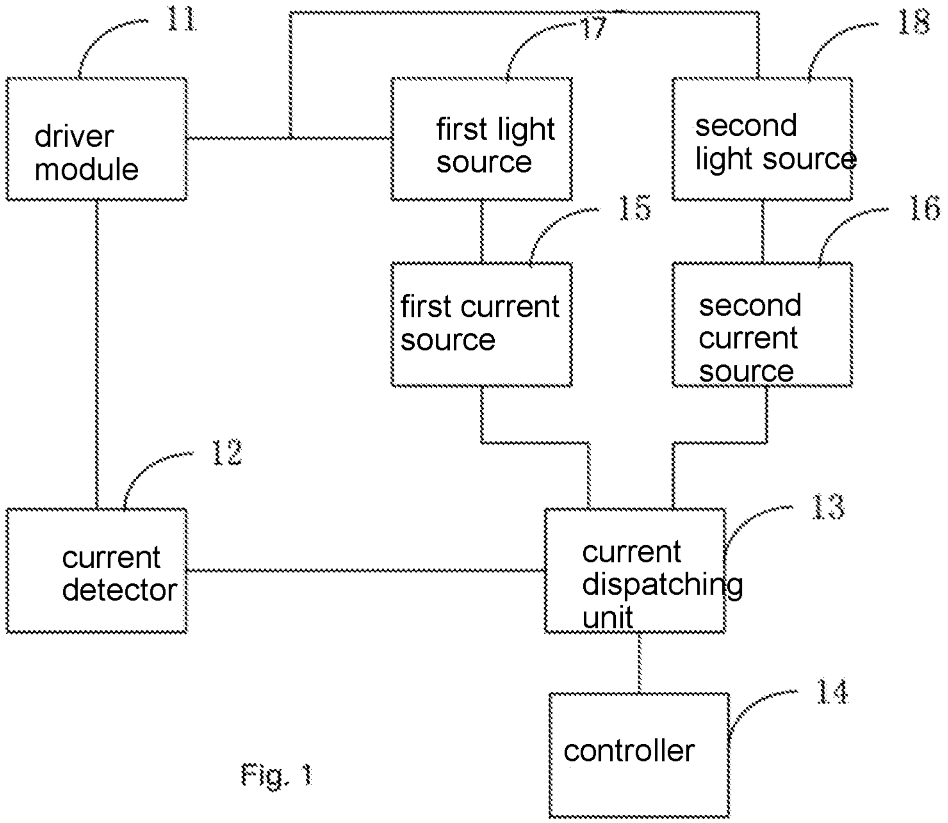
FIG. 1 illustrates a circuit diagram of a first embodiment.

FIG. 1 shows another embodiment without loop back control. Reference numerals in FIG. 3 refer to the same components in FIG. 1.

Figure 2:
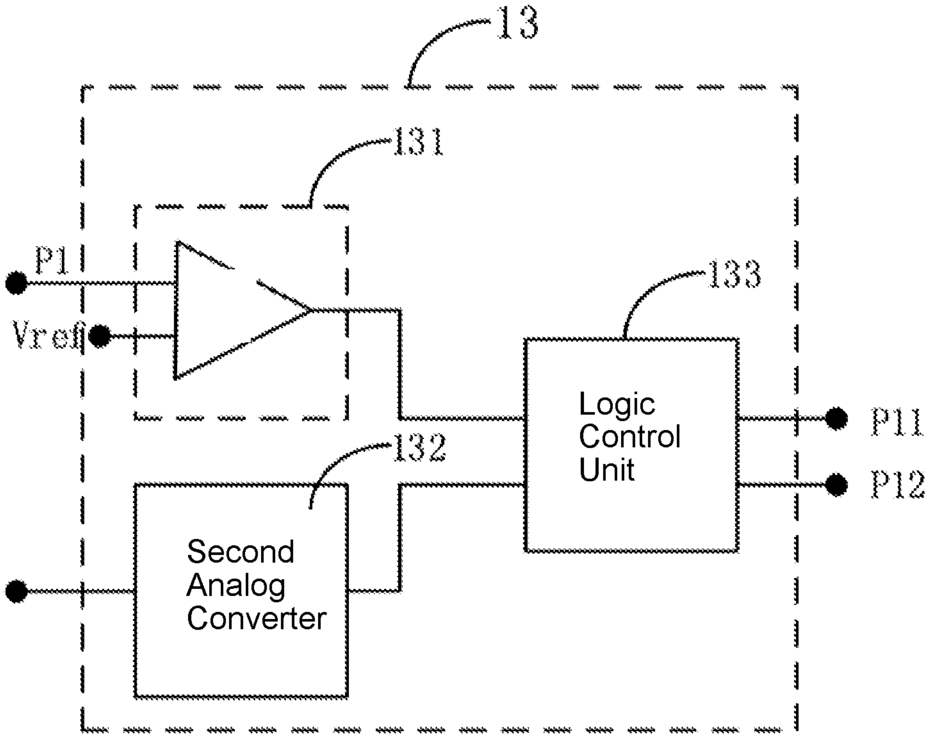
FIG. 2 illustrates a current dispatching unit example.

FIG. 2 shows an example of current dispatching unit 13 as a signal converter mentioned above. In FIG. 2, the control signal P1 and a Vref are supplied to a comparator 131. The second analog converter 132 is used for generating an analog signal supplied to the logic control unit 133 to generate P11 and P12.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a first light source of a light source set;

a second light source of the light source set;

a current controller;

a current source controlled by the current controller for generating a first driving current to the first light source and for generating a second driving current to the second light source; and a signal converter for converting a first type control signal to a second type control signal, wherein the first type control signal indicates a light parameter to be produced by the light source set and the second light source, wherein the second type control signal is supplied to the current controller to determine the first driving current and the second driving current, wherein the signal converter is capable of receiving multiple formats of first type control signal, wherein the multiple formats comprise Pulse Width Modulation signals and I2C signals that both are capable of being handled for the first type control signal, wherein the signal converter comprises a PWM receiver and a comparator, wherein the comparator compares the first PWM signal from the PWM receiver with a first reference signal.

2. The lighting apparatus of claim 1, wherein the first type control signal further comprises a second PWM signal, wherein the first PWM signal corresponds to the first driving current and the second PWM signal corresponds to the second driving current.

3. The lighting apparatus of claim 1, wherein one of the multiple formats is a single bus interface signal.

4. The lighting apparatus of claim 1, wherein one of the multiple formats is a wireless signal received from an external device.

5. The lighting apparatus of claim 1, wherein the current controller comprises a current detector for detecting the first driving and the second driving current for generating a second reference signal.

6. The lighting apparatus of claim 5, wherein the current controller uses the second reference signal to calibrate the first driving current and the second driving current.

7. The lighting apparatus of claim 1, wherein the signal converter has a priority list for choosing one first type control signal as a major signal to convert to the second type control signal.

8. The lighting apparatus of claim 1, wherein the first type control signal is a digital signal and the second type control signal is an analog signal corresponding to the first type control signal.

9. The lighting apparatus of claim 8, wherein the first type control signal is turned on and turned off alternatively associated with a duty ratio, wherein the second type control signal is kept constant corresponding to the duty ratio.

10. The lighting apparatus of claim 1, wherein the first type control signal is corresponding to a wall switch for indicating the first light parameter.

11. The lighting apparatus of claim 1, wherein the light parameter comprises a mixed color temperature by the light source set.

12. The lighting apparatus of claim 1, wherein the light source set comprises a third light source receiving a third driving current of the current source.

13. The lighting apparatus of claim 12, wherein the light source set comprises a fourth light source receiving a fourth driving current of the current source.

14. The lighting apparatus of claim 13, wherein the first light source emits a red light, the second light source emits a green light, the third light source emits a blue light, and the fourth light source emits a white light.

15. The lighting apparatus of claim 14, wherein the first light source, the second light source, the third light source and the fourth light source are mounted on a single light source plate.

16. The lighting apparatus of claim 1, wherein the current source dispatches a first part of a total current to be the first driving current and dispatches a second part of the total current to be the second driving current.

17. The lighting apparatus of claim 16, wherein when the first type control signal is unchanged, the first driving current and the second driving current keep constant.

* * * * *